US009456205B2

(12) United States Patent
Seen et al.

(10) Patent No.: US 9,456,205 B2
(45) Date of Patent: Sep. 27, 2016

(54) MOBILE TERMINAL AND METHOD OF CONTROLLING THE OPERATION OF THE MOBILE TERMINAL

(75) Inventors: Seungmin Seen, Seoul (KR); Jinsool Lee, Seoul (KR); Taeyun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 579 days.

(21) Appl. No.: 13/229,590

(22) Filed: Sep. 9, 2011

(65) Prior Publication Data

US 2012/0069005 A1 Mar. 22, 2012

(30) Foreign Application Priority Data

Sep. 20, 2010 (KR) ........................ 10-2010-0092610

(51) Int. Cl.
*G06F 3/048* (2013.01)
*G06T 15/00* (2011.01)
*H04N 13/02* (2006.01)
(Continued)

(52) U.S. Cl.
CPC ......... *H04N 13/0497* (2013.01); *G06T 7/0022* (2013.01); *G06T 7/0075* (2013.01); *H04N 13/007* (2013.01); *H04N 13/0239* (2013.01); *G06T 2207/10012* (2013.01);
(Continued)

(58) Field of Classification Search
CPC ...... H04N 13/00; H04N 7/26; H04N 19/533; H04N 13/0022; H04N 13/007; H04N 2013/0081; G06T 15/00; G06T 2207/10021; G06T 2207/20092; G06T 7/0022

USPC .................. 348/42, 46; 345/418, 419, 427; 359/462; 386/97; 375/240.16, 240.24
See application file for complete search history.

(56) References Cited

U.S. PATENT DOCUMENTS 5,734,743 A * 3/1998 Matsugu et al. .............. 382/154
6,043,838 A * 3/2000 Chen .............................. 348/42
(Continued)

FOREIGN PATENT DOCUMENTS

CN 1864415 11/2006
CN 101231754 7/2008
(Continued)

OTHER PUBLICATIONS

Japan Patent Office Application Serial No. 2011-203240, Office Action dated Jan. 29, 2013, 5 pages.
(Continued)

*Primary Examiner* — Sath V Perungavoor
*Assistant Examiner* — Albert Kir
(74) *Attorney, Agent, or Firm* — Lee, Hong, Degerman, Kang & Waimey; Jonathan Kang; Richard Salfelder

(57) ABSTRACT

A mobile terminal and a method of controlling the operation of the mobile terminal are provided. The method includes dividing each of first and second images into a plurality of blocks, the first and second images capable of realizing a three-dimensional (3D) image using binocular disparity; searching the first and second images for pairs of matching blocks and calculating depth information of each of the pairs of matching blocks based on a difference in position between each of the pairs of matching blocks; and calculating stereoscopic information of the 3D image based on the depth information of each of the pairs of matching blocks. Therefore, it is possible to effectively provide stereoscopic information of a 3D image for various purposes.

18 Claims, 13 Drawing Sheets

(51) Int. Cl.
*H04N 13/04* (2006.01)
*G06T 7/00* (2006.01)
*H04N 13/00* (2006.01)

(52) U.S. Cl.
CPC ............ *G06T 2207/10021* (2013.01); *G06T 2207/20021* (2013.01); *H04N 13/0022* (2013.01); *H04N 2013/0081* (2013.01)

(56) References Cited

U.S. PATENT DOCUMENTS

| | | | |
|---|---|---|---|
| 6,208,348 B1* | 3/2001 | Kaye | 345/419 |
| 6,573,855 B1* | 6/2003 | Hayakawa et al. | 342/22 |
| 6,674,431 B1* | 1/2004 | Enomoto et al. | 345/419 |
| 2002/0009147 A1* | 1/2002 | Ernst | H04N 19/533 375/240.24 |
| 2006/0120712 A1 | 6/2006 | Kim | |
| 2009/0324059 A1* | 12/2009 | Boughorbel | 382/154 |
| 2010/0272417 A1* | 10/2010 | Nagasawa et al. | 386/97 |
| 2011/0038418 A1* | 2/2011 | Pandit et al. | 375/240.16 |
| 2011/0292043 A1* | 12/2011 | Kim et al. | 345/419 |
| 2013/0286017 A1* | 10/2013 | Marimon | G06T 15/00 345/427 |

FOREIGN PATENT DOCUMENTS

| | | |
|---|---|---|
| CN | 101277454 | 10/2008 |
| CN | 101459857 | 6/2009 |
| JP | 2008103820 | 5/2008 |
| JP | 2010177921 | 8/2010 |

OTHER PUBLICATIONS

State Intellectual Property Office of the People's Republic of China Application Serial No. 201110290038.3, Office Action dated Sep. 23, 2013, 6 pages.

Kauff, et al., "Depth map creation and image-based rendering for advanced 3DTV services providing interoperability and scalability," Signal Processing: Image Communication, Elsevier Science Publishers, vol. 22, No. 2, XP005938670, Mar. 2007, pp. 217-234.

European Patent Office Application Serial No. 11007434.1, Search Report dated Nov. 10, 2014, 9 pages.

* cited by examiner (a)

(b)

(a)

(b)

MOBILE TERMINAL AND METHOD OF CONTROLLING THE OPERATION OF THE MOBILE TERMINAL

CROSS-REFERENCE TO RELATED APPLICATION

This application claims the benefit of earlier filing date and right of priority to Korean Patent Application No. 10-2010-0092610, filed on Sep. 20, 2010, the contents of which is incorporated by reference herein in its entirety.

BACKGROUND OF THE INVENTION

1. Field of the Invention

The present invention relates to a mobile terminal and a method of controlling the operation of the same, and more particularly, to a mobile terminal and a method of controlling the operation of the mobile terminal, in which stereoscopic information on a three-dimensional (3D) image can be provided.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed.

In the meantime, various techniques for creating a three-dimensional (3D) image by combining a plurality of two-dimensional (2D) images captured by a camera and processing the result of the combination have been developed. By applying the various techniques to mobile terminals, it is possible to create and display various 3D images using mobile terminals.

The three dimensionality of a 3D image is based on the disparity between left- and right-eye images of the 3D image and varies according to the difference in the position of an object within the left- and right-eye images. However, since there are yet no methods to properly measure the three dimensionality of 3D images, the evaluation of the three dimensionality of 3D images may often rely largely on viewers' subjective opinions.

Thus, a method is needed to quantitatively analyze and measure the three dimensionality of 3D images and to effectively use the results of the analysis and the measurement to control various operations performed by mobile terminals.

SUMMARY OF THE INVENTION

The present invention provides a mobile terminal and a method of controlling the operation of the mobile terminal, in which stereoscopic information on a three-dimensional (3D) image can be efficiently used to control various operations performed by the mobile terminal.

According to an aspect of the present invention, there is provided a method of controlling the operation of a mobile terminal, the method including dividing at least one of first and second images into a plurality of blocks, the first and second images capable of realizing a 3D image using binocular disparity; searching the first and second images for pairs of matching blocks and calculating depth information of each of the pairs of matching blocks based on a difference in position between each of the pairs of matching blocks; and calculating stereoscopic information of the 3D image based on the depth information of each of the pairs of matching blocks.

According to another aspect of the present invention, there is provided a mobile terminal including a display module configured to display thereon a 3D image based on first and second images using binocular disparity; and a controller configured to divide at least one of first and second images into a plurality of blocks, search the first and second images for pairs of matching blocks, calculate depth information of each of the pairs of matching blocks based on a difference in position between each of the pairs of matching blocks, calculate stereoscopic information of the 3D image based on the depth information of each of the pairs of matching blocks and display the stereoscopic information on the display module.

According to another aspect of the present invention, there is provided a method of controlling the operation of a mobile terminal, the method including displaying a 3D image on a display module based on first and second images using binocular disparity; and displaying a stereoscopic information gauge on the display module, the stereoscopic information gauge showing stereoscopic information of the 3D image, which is calculated based on depth information of an object included in the first and second images.

According to another aspect of the present invention, there is provided a mobile terminal including a display module configured to display a 3D image thereon based on first and second images using binocular disparity; and a controller configured to display a stereoscopic information gauge on the display module, the stereoscopic information gauge showing stereoscopic information of the 3D image, which is calculated based on depth information of an object included in the first and second images.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a camera, a navigation device, a tablet computer, or an electronic book (e-book) reader. In this disclosure, the terms 'module' and 'unit' can be used interchangeably.

Figure 1:
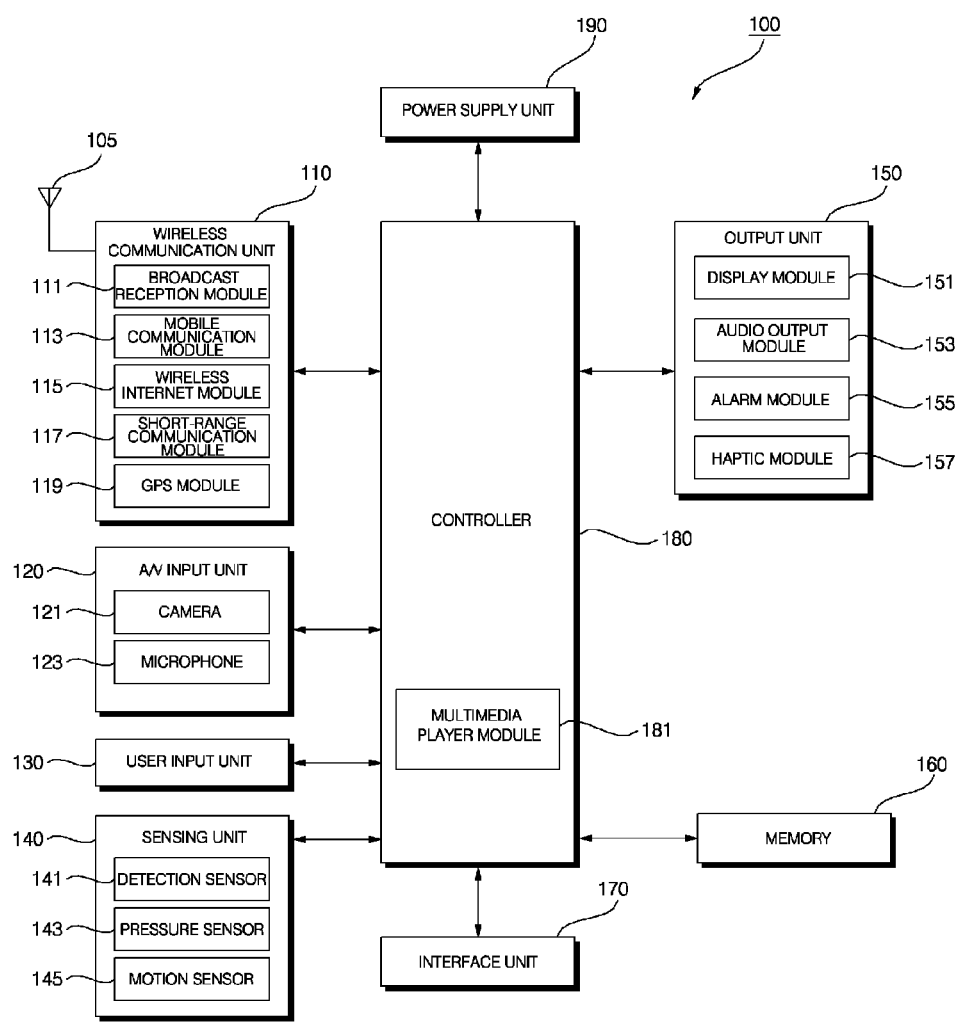
FIG. 1 is a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
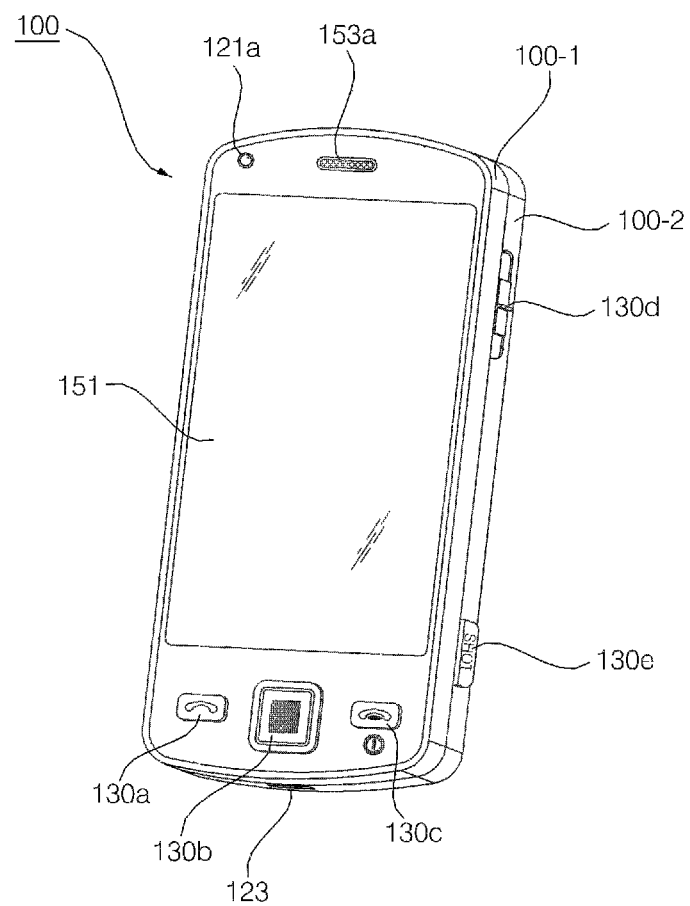
FIG. 2 is a front perspective view of the mobile terminal shown in FIG. 1.
Figure 3:
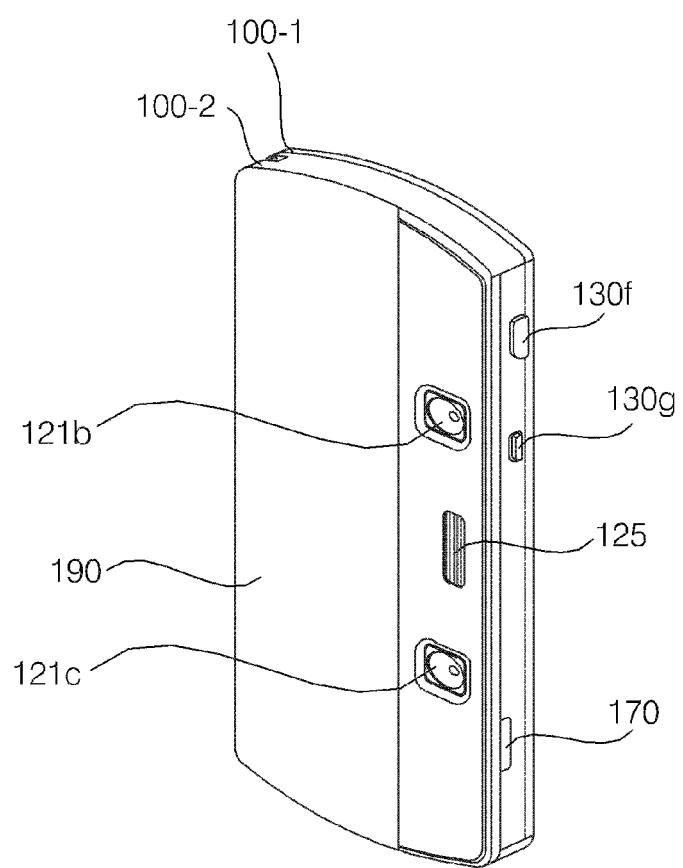
FIG. 3 is a rear perspective view of the mobile terminal shown in FIG. 2.
Figure 4:
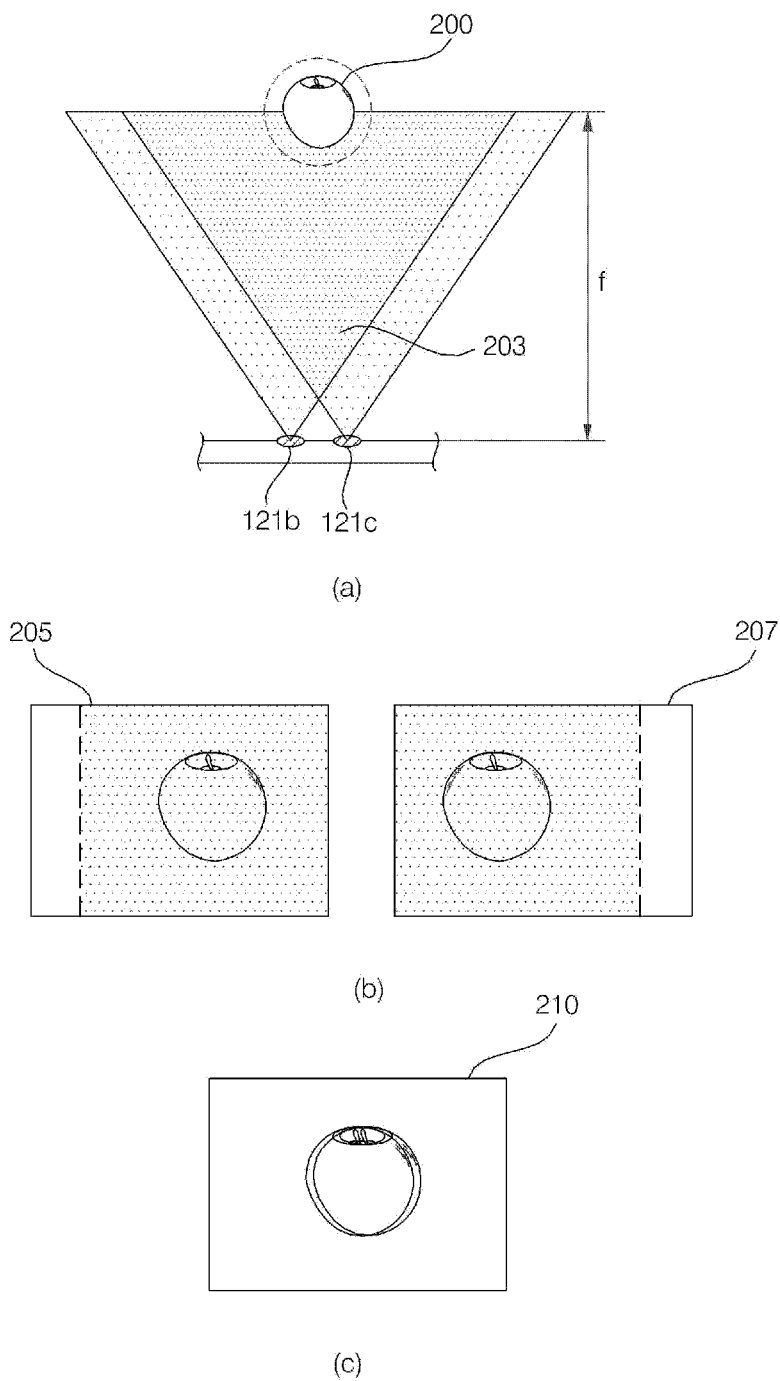
FIGS. 4 through 7 are diagrams illustrating examples of how to calculate stereoscopic information for use in the mobile terminal shown in FIG. 1.

FIG. 2 illustrates a front perspective view of the mobile terminal 100, and FIG. 3 illustrates a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153*a*, a camera 121*a*, and first through third user input modules 130*a* through 130*c* may be disposed in the main body of the mobile terminal 100, and particularly, on the front case 100-1. Fourth and fifth user input modules 130*d* and 130*e* and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153*a* may be implemented as a receiver or a speaker. The camera 121*a* may be configured to be suitable for capturing a still or moving image of the user. The microphone 123 may be configured to properly receive the user's voice or other sounds.

The first through fifth user input modules 130*a* through 130*e* and sixth and seventh user input modules 130*f* and 130*g* may be collectively referred to as the user input unit 130, and any means can be employed as the first through seventh user input modules 130*a* through 130*f* so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130a through 130c may operate as function keys for entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, two cameras 121b and 121c may be additionally provided at the rear of the rear case 100-2, and the sixth and seventh user input modules 130f and 130g and the interface unit 170 may be disposed on one side of the rear case 100-2.

The cameras 121b and 121c may have an image capture direction which is substantially the opposite to that of the camera 121a, and may have a different resolution from that of the camera 121a. The cameras 121b and 121c may be used at the same time to create a three-dimensional (3D) image during a 3D image capture mode, or may be used independently to create a two-dimensional (2D) image. One of the cameras 121b and 121c may be configured to be able to be moved. Thus, the distance between the cameras 121b and 121c can be adjusted by moving one of the cameras 121b and 121c away from or closer to the other camera.

A flash 125 and a minor may be disposed between the cameras 121b and 121c. When an image of a subject is captured with the cameras 121b and 121c, the flash 125 may illuminate the subject. The minor may allow the user to see him- or herself when he or she wants to capture his or her own image.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

FIGS. 4 through 7 are diagrams for explaining examples of how to calculate stereoscopic information for use in the mobile terminal 100. The mobile terminal 100 may create a 3D image using two cameras at the rear of the main body thereof, i.e., the cameras 121b and 121c. For convenience, the cameras 121b and 121c will hereinafter be referred to as the first and second cameras 121b and 121c, respectively.

Referring to FIGS. 4(a) and 4(b), first and second images 205 and 207 may be obtained by shooting a subject 200 with the first and second cameras 121b and 121c.

The first and second images 205 and 207 may correspond to left- and right-eye images, respectively, for use in the creation of a 3D image. Referring to FIG. 4(c), the controller 180 may create a 3D image 210 by combining the first and second images 205 and 207 in consideration of the disparities between the first and second images 205 and 207.

3D imaging is a technique for creating the illusion of depth in an image and thus providing viewers with a vivid sense of reality. The two eyes are about 65 mm apart from each other. Thus, when each of the two eyes is presented with different 2D images of the world, the 2D images are projected onto the retinas of the two eyes, and the brain extracts depth from the 2D retinal images using binocular disparity, which results from the horizontal separation of the two eyes and is one of the most important factors that should be considered when designing a 3D display device.

The 3D image 210 may be displayed on the display module 151 or may be printed out. The mobile terminal 100 may also create a 3D video using almost the same method used to create the 3D image 210.

There are various methods of displaying a 3D image such as a stereoscopic display method, which is a method of displaying a 3D image with the use of glasses, an auto-stereoscopic display method, which is a method of displaying a 3D image without the use of glasses and is also called glasses-free 3D, and a projection method, which uses holography. The stereoscopic display method is generally used in home TV sets, and the auto-stereoscopic display method is generally used in mobile terminals.

Examples of the auto-stereoscopic display method include, but are not limited to a lenticular display method, a parallax barrier method and a parallax illumination method. The lenticular display method involves using a sheet of hemispherical lenticular lenses to the front of a device that displays left- and right-eye images. The parallax barrier display method involves projecting left- and right-eye images through a parallax barrier. The parallax illumination method involves placing an illumination plate behind an LCD so as to make alternate columns of pixels visible to the left and right eyes.

The above-mentioned methods of creating or displaying a 3D image can be applied to mobile terminals and other devices.

The depth of an object in a 3D image may vary according to the difference in the position of the object within the left- and right-eye images. It will hereinafter be described in detail various examples of how to calculate the depth of an object in a 3D image.

Figure 5:
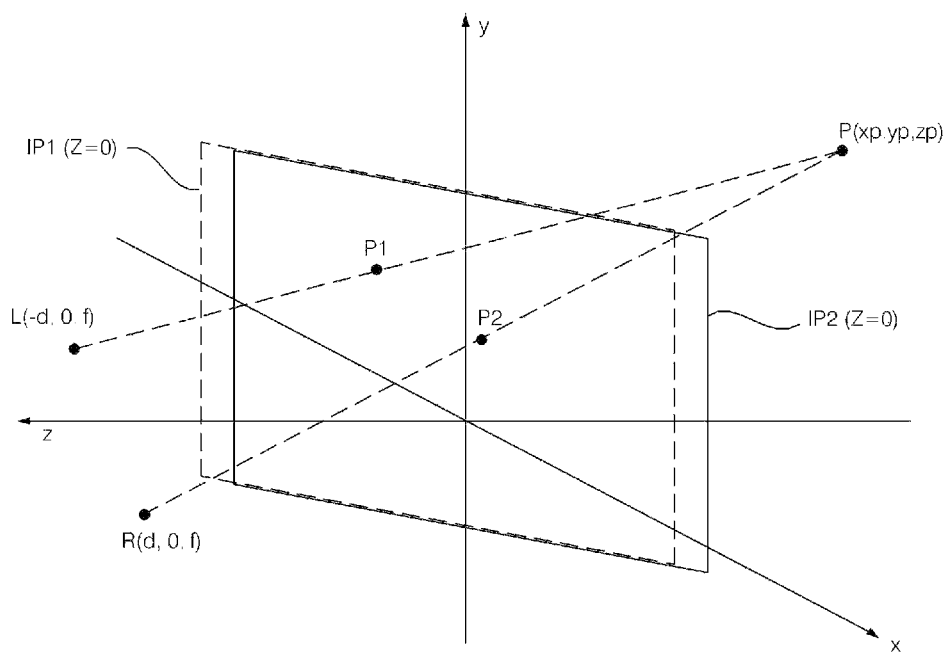
Figure 6:
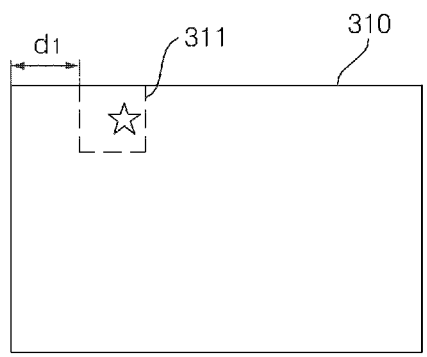
Figure 6:
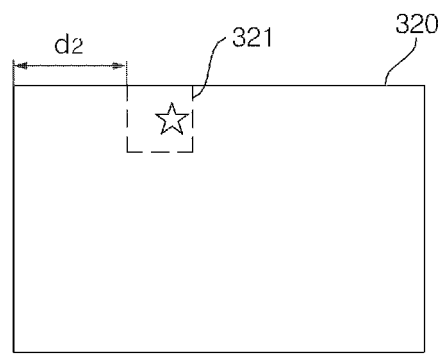
Figure 6:
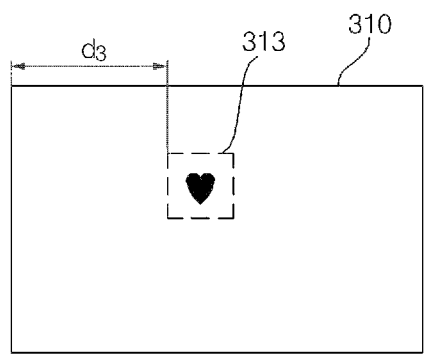
Figure 6:
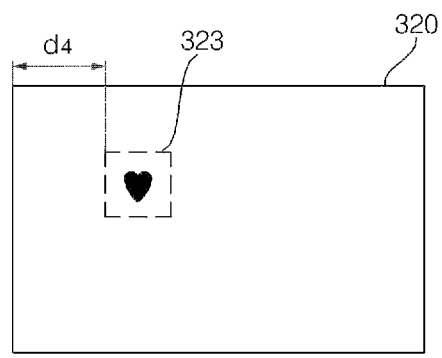

FIG. 5 is a diagram illustrating an example of how to calculate the depth of an object in a 3D image. Referring to FIG. 5, a z coordinate $z_p$ of a point P, which is the location of an object, may be calculated using a triangle formed by a right-eye position R, the point P, and a point P2, which is a projection onto a right-eye image plane IP2, and a triangle formed by a left-eye position L, the point P, and a point P1, which is a projection onto a left-eye image plane IP1, as indicated by Equation (1):

$$z_p = f - \frac{2df}{x'' - x'} \tag{1}$$

where x" indicates an x coordinate of the point P2, x' indicates an x coordinate of the point P1, 2d indicates the distance between the left and right eyes, and f indicates the distance between the eyes and a virtual screen.

Therefore, the depth between the eyes (or a camera) and the object, i.e., depth, may be calculated using Equation (2):

$$\text{depth} = f - z_p = f - \left(f - \frac{2df}{x'' - x'}\right) = \frac{2df}{x'' - x'}. \tag{2}$$

Referring to Equation (2), the depth of the object may be calculated using the difference in the x coordinate of the object within the left and right eyes of a 3D image.

Since the point P1 is on the left side of the point P2, the result of subtracting the x coordinate of the point P1 from the x coordinate of the point P2 may have a positive value, which is referred to as positive parallax. In this case, the object may appear to be located behind the virtual screen.

On the other hand, when the result of subtracting the x coordinate of the point P1 from the x coordinate of the point P2 has a negative value, i.e., when negative parallax occurs, the object may appear to be located in front of the virtual screen. When the point P1 and the point P2 coincide with each other, i.e., when zero parallax occurs, the object may appear to be located on the virtual screen.

In the above-mentioned manner, the depth of an object in a 3D image and the relationship between the depth of the object and the degree of eye fatigue can be calculated. Medical studies show that a viewer may begin to feel fatigue when the convergence angle when viewing an object exceeds about 1.5 degrees. That is, the convergence angle becomes higher when focusing on a near object than when focusing on a far object, and the greater the convergence angle, the more fatigue a viewer has.

FIGS. 6(a) and 6(b) are diagrams illustrating another example of how to calculate the depth of an object in a 3D image. Referring to FIG. 6(a), at least one of a left-eye image 310 and a right-eye image 320 may be divided into a plurality of blocks. Thereafter, a block of the right-eye image 320 that matches a first block 311 of the left-eye image 310, i.e., a second block 321, may be searched for.

In order to search the right-eye image 320 for the best matching block for the first block 311, a block matching algorithm using an evaluation function such as a mean square error (MSE) function, a mean absolute error (MAE) function or a mean absolute difference (MAD) function may be used. When each of the left- and right-eye images 310 and 320 is divided into a plurality of M×N blocks, the MSE and MAE functions may be defined by Equations (3) and (4), respectively:

$$MSE(i, j) = \frac{1}{MN}\sum_{m=0}^{M}\sum_{n=0}^{N}[L_k(m, n) - R_k(m + i, n + j)]^2; \quad (3)$$

and $$MAE(i, j) = \frac{1}{MN}\sum_{m=0}^{M}\sum_{n=0}^{N}|L_k(m, n) - R_k(m + i, n + j)| \quad (4)$$

where $L_k$ indicates a k-th block of the left-eye image 310 and $R_k$ indicates a k-th block of the right-eye image 310. The evaluation function may select a block with a minimum MAD or MSE from the right-eye image 320 as the best matching block for the first block 311.

Since an object in a 3D image generally has the same y coordinate, but different x coordinates, in left- and right-eye images of the 3D image, an evaluation function that varies only x coordinates may be used.

Once the second block 321 is discovered, depth information may be calculated using the difference between an x coordinate $d_1$ of the first block 311 and an x coordinate $d_2$ of the second block 321.

Similarly, referring to FIG. 6(b), a block of the right-eye image 320 that matches a third block 313 of the left-eye image 310, i.e., a fourth block 323, may be searched for. Then, depth information may be calculated using the difference between an x coordinate $d_3$ of the third block 313 and an x coordinate $d_4$ of the fourth block 323.

The above-mentioned block matching operation may be performed on the entire left- and right-eye image 310 or 320, thereby calculating depth information in units of the blocks of the left- and right-eye image 310 or 320.

Once depth information for each of the blocks of the left- and right-eye image 310 or 320 is calculated, stereoscopic information of a 3D image constituted by the left- and right-eye images 310 and 320 can be calculated. The stereoscopic information may be calculated, in units of frames, as an average or standard deviation of the depths of the blocks of the left- and right-eye images 310 and 320. The stereoscopic information may also be calculated based on whether there are smooth variations in depth between neighboring objects in the 3D image.

Figure 7:
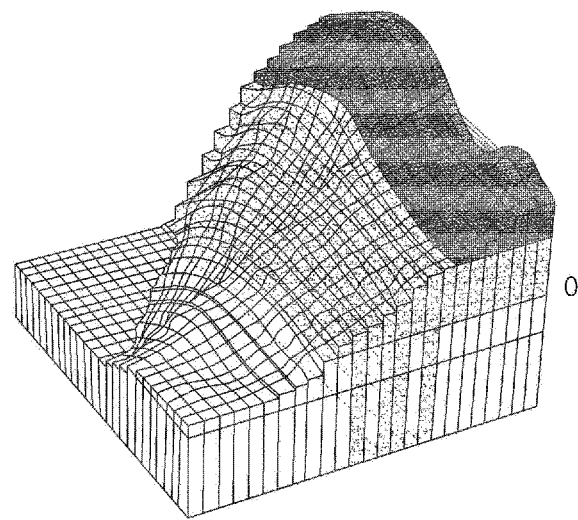

The stereoscopic information may be provided as numeric data or as a graph or 3D image, as shown in FIG. 7.

Figure 8:
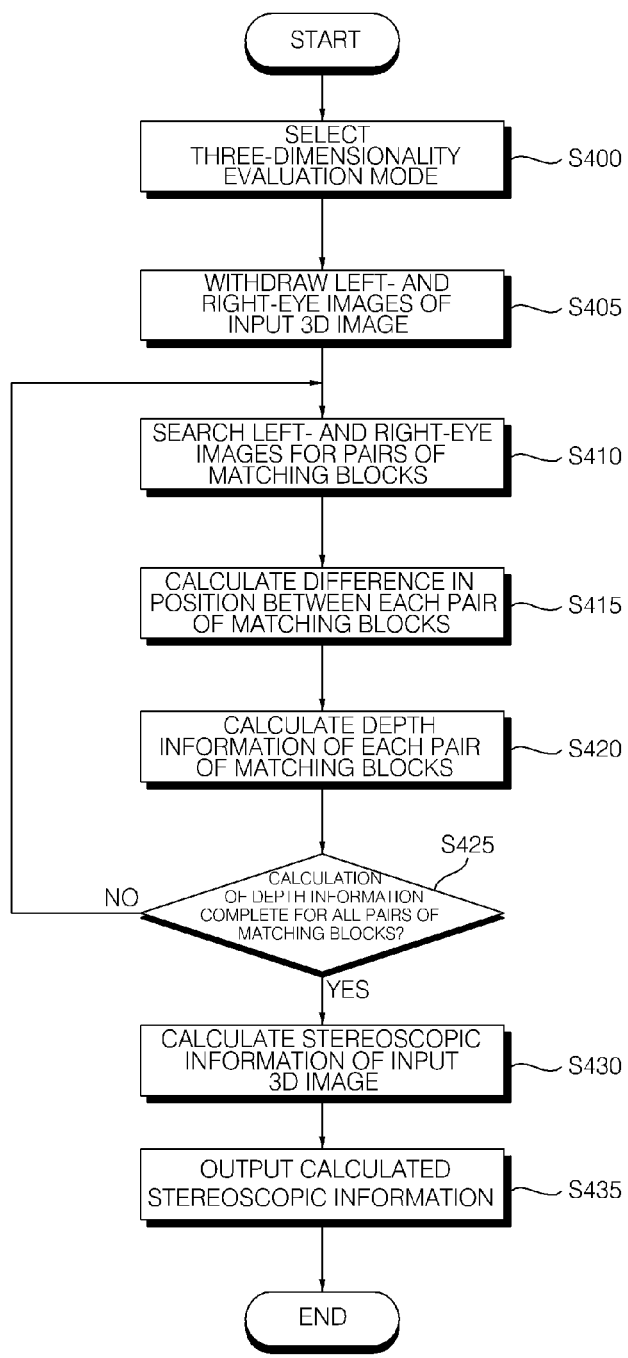
FIG. 8 is a flowchart of a method of controlling the operation of a mobile terminal, according to an exemplary embodiment of the present invention.

FIG. 8 is a flowchart of a method of controlling the operation of a mobile terminal, according to an exemplary embodiment of the present invention, and particularly, how to calculate stereoscopic information of a 3D image. Referring to FIG. 8, if a three-dimensionality evaluation mode, which is a mode for calculating stereoscopic information of a 3D image, is selected in response to, for example, a user command (S400), the controller 180 may withdraw left- and right-eye images of an input 3D image from the memory 160 (S405).

Thereafter, the controller 180 may divide each of the left- and right-eye images into a plurality of blocks, and may search the left- and right-eye images for a pair of matching blocks (S410). Thereafter, the controller 180 may calculate the difference in position between the pair of matching blocks (S415), and may calculate depth information of the pair of matching blocks based on the results of the calculation performed in operation S415.

If the calculation of depth information is complete for all pairs of matching blocks within the left- and right-eye images (S425), the controller 180 may calculate stereoscopic information of the input 3D image based on the depth information of all the pairs of matching blocks within the left- and right-eye images (S430).

As described above, the stereoscopic information may be calculated as, for example, an average or standard deviation of the depth information of each of the pairs of matching blocks, according to a predefined set of rules.

Thereafter, the controller 180 may output the stereoscopic information (S435). More specifically, the controller 180 may output the stereoscopic information as numeric data, a graph or an image. The controller 180 may store the stereoscopic information in connection with the input 3D image for later use.

The exemplary embodiment of FIG. 8 has been described, taking the calculation of stereoscopic information of a still image as an example. However, the present invention can also be applied to the calculation of stereoscopic information of a 3D video. More specifically, the same method used to calculate stereoscopic information of a still image may be performed on each frame of a 3D video, thereby calculating stereoscopic information of the 3D video. In this case, the stereoscopic information of the 3D video may be calculated in units of frames or play segments of the 3D video.

Figure 9:
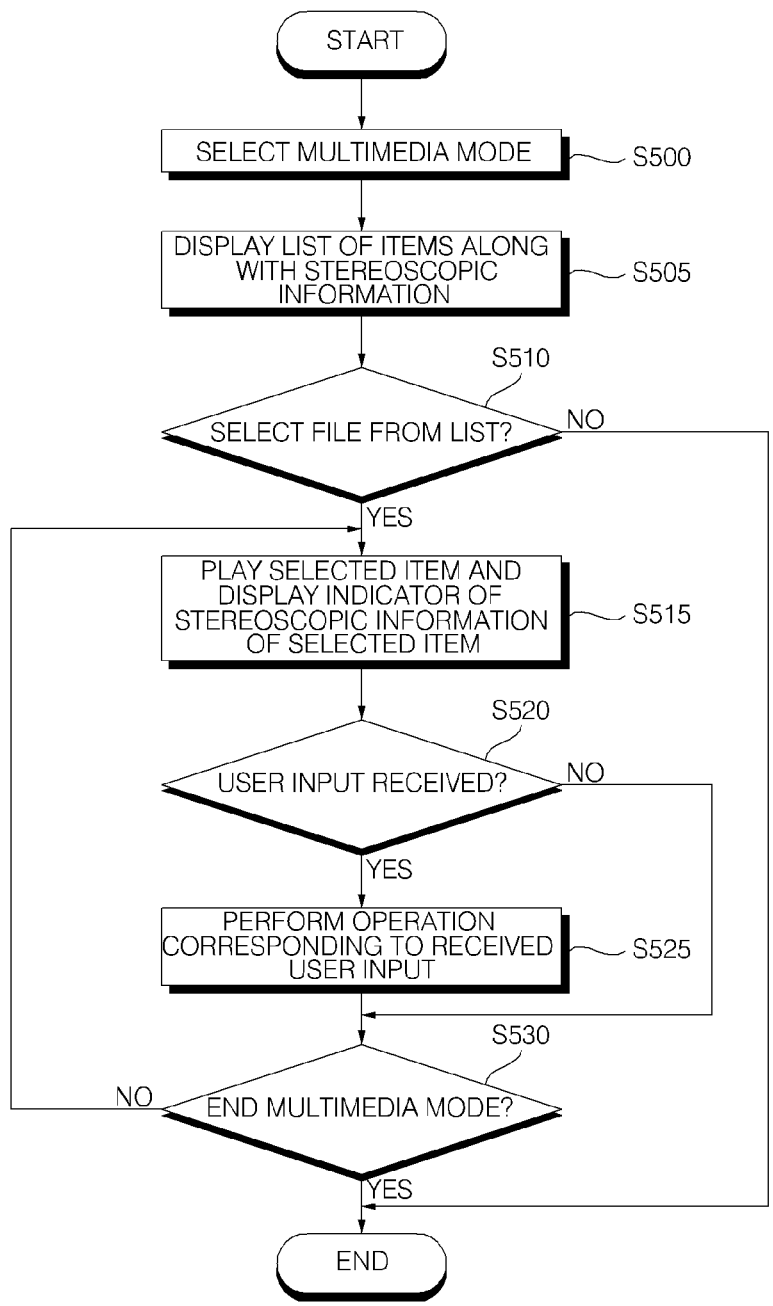
FIG. 9 is a flowchart of a method of controlling the operation of a mobile terminal, according to another exemplary embodiment of the present invention.

FIG. 9 is a flowchart of a method of controlling the operation of a mobile terminal, according to another exemplary embodiment of the present invention, and particularly, how to utilize stereoscopic information of a 3D image during a multimedia mode. Referring to FIG. 9, if a multimedia mode, which is a mode for viewing a photo album or playing a video file is selected in response to, for example, a user command (S500), the controller 180 may display a list of files on the display module 151 (S505). In this case, if the displayed list includes 2D images, the controller 180 may also display the names or thumbnail images of the 2D images. If the displayed list includes 3D images, the controller 180 may also display not only the names or thumbnail images of the 3D images but also stereoscopic information of the 3D images. The stereoscopic information of the 3D images may be displayed using numeric data or figures.

If one of the files in the displayed list is selected (S510), the controller 180 may play the selected file. If the selected file is a 3D image with stereoscopic information, the controller 180 may display a stereoscopic information gauge on the display module 151 (S515).

If a user command for controlling the playback of the selected file such as 'stop,' 'fast forward,' or 'rewind' is received (S520), the controller 180 may control the playback of the selected file in accordance with the received user command (S525). If the selected file is a 3D video, the playback of the 3D video may be controlled in response to a user input detected from the stereoscopic information gauge.

Operations S515 through S525 may be repeatedly performed until the multimedia mode is terminated (S530).

Stereoscopic information can be used in various operating modes of the mobile terminal 100, other than the multimedia mode. For example, stereoscopic information may be displayed on a camera preview screen during the acquisition of a 3D image, thereby allowing a user to select a proper composition based on the stereoscopic information. In addition, the playback of a 3D content may be automatically controlled based on stereoscopic information of the 3D content.

FIGS. 10 through 15 are diagrams illustrating various examples of how to use stereoscopic information.

Figure 10:
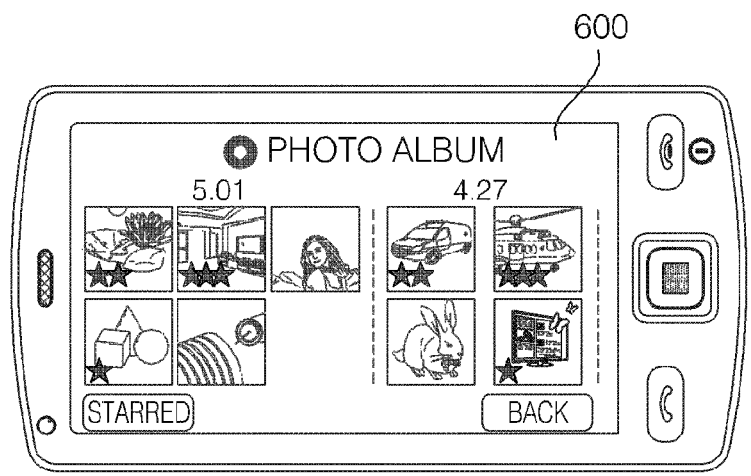
FIGS. 10 through 14 are diagrams illustrating various examples of the use of stereoscopic information.

Referring to FIG. 10, during a multimedia mode, the thumbnail images of files that can be played may be displayed on a 'photo album' screen 600. The thumbnail images of 3D images may be marked with a number of stars in order to indicate the existence of stereoscopic information. More specifically, the number of stars each thumbnail image of is marked with corresponds to the degree of three dimensionality of a corresponding file. For example, the thumbnail images of 2D images may be marked with no stars, whereas the thumbnail images of 3D images may be marked with more than one star. In addition, the thumbnail image of a 3D image with a high degree of three dimensionality may be marked with more stars than the thumbnail image of a 3D image with a low degree of three dimensionality. Therefore, it is possible for a user to selectively view highly stereoscopic images based on their star ratings.

Figure 11:
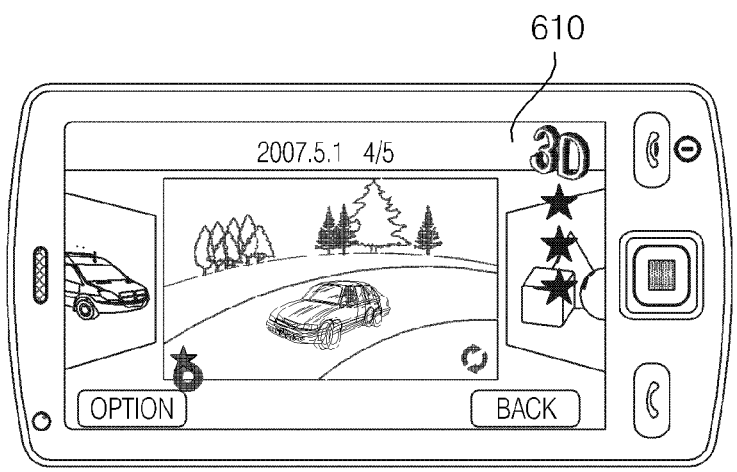
Figure 12:
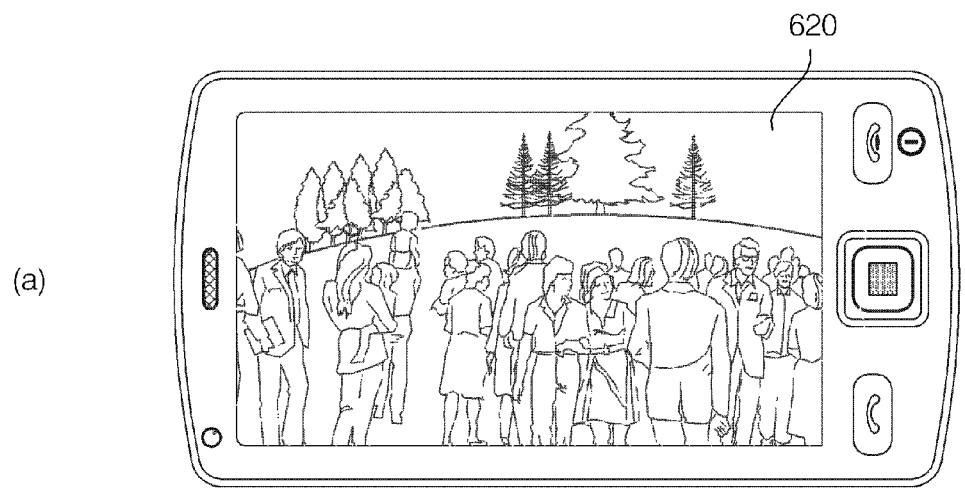
Figure 12:
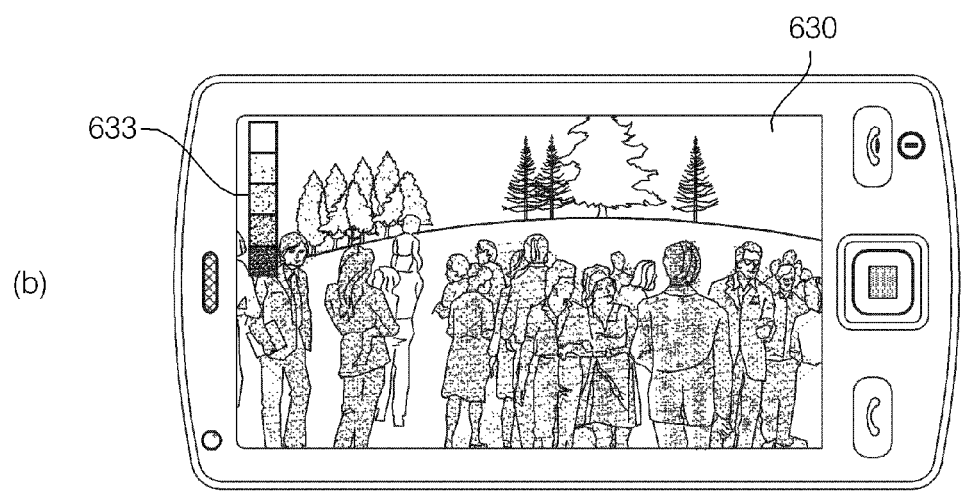

Referring to FIG. 11, the degree of three dimensionality of a whole 3D content or a current frame of the 3D content may be displayed on one side of a 3D content playback screen 610 as a star rating.

Referring to FIGS. 12(a) and 12(b), if a user chooses to display stereoscopic information of a 3D content when a 3D content playback screen 620 is displayed, a display screen 630 obtained by converting the 3D content playback screen 620 to a gray mode may be displayed, and a bar-shaped stereoscopic information gauge 633 may be displayed on one side of the display screen 630. The bar-shaped stereoscopic information gauge 633 may be divided into a plurality of sections filled with different colors.

Then, a user may select a desired level of three dimensionality from the bar-shaped stereoscopic information gauge 633 and may thus adjust the level of three dimensionality of the 3D content. Thereafter, the controller 180 may convert the 3D content playback screen 620 back to an original color mode, and may display only a few objects selected from the 3D content three-dimensionally and other non-selected objects two-dimensionally.

Figure 13:
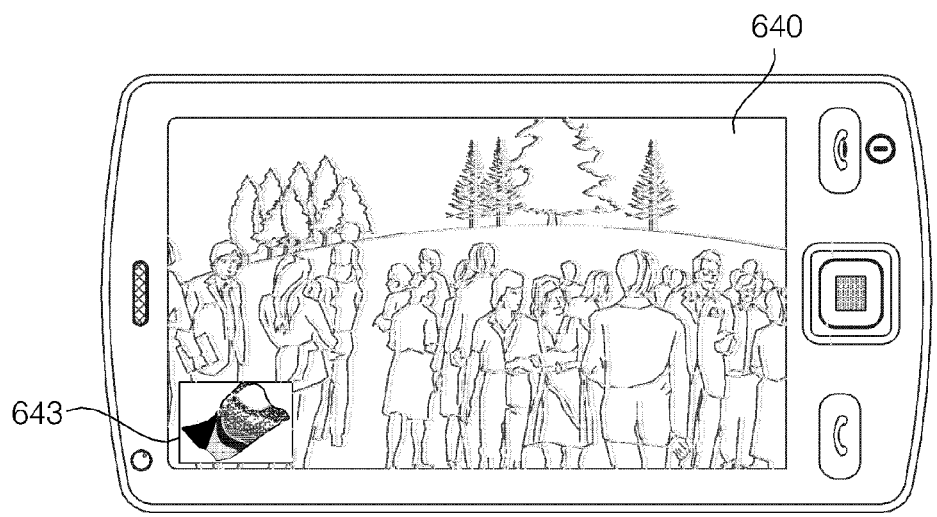

Referring to FIG. 13, depth information of each of a plurality of blocks of a 3D image may be displayed on one side of a display screen 640 showing the 3D image as a 3D image 643.

Figure 14:
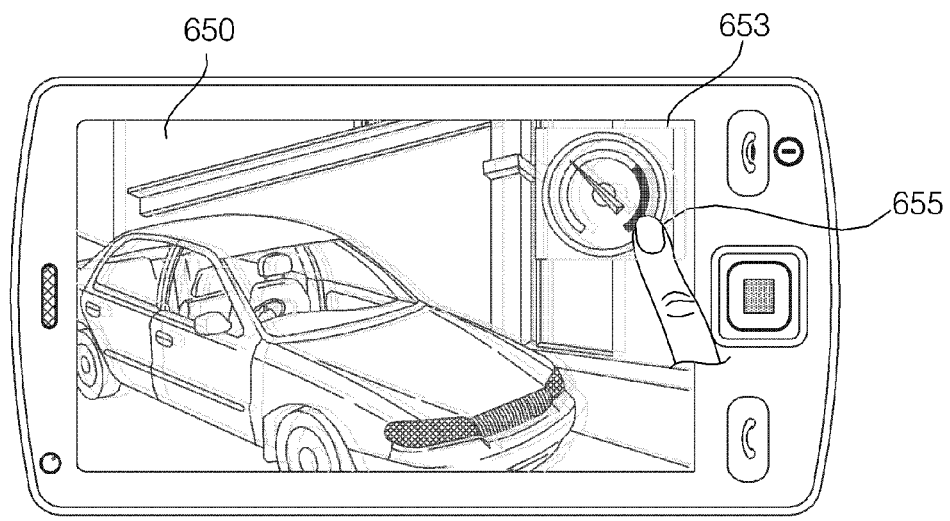

Referring to FIG. 14, a stereoscopic information gauge 653 may be displayed on one side of a display screen 650 showing a 3D image, thereby providing stereoscopic information of the 3D image in real time. The stereoscopic information gauge 653 may be displayed upon the request of a user or only when the degree of three dimensionality of the 3D image exceeds a reference level. The degree of three dimensionality of the 3D image may be adjusted using the stereoscopic information gauge 653. For example, when the user feels too much fatigue from too high a degree of three dimensionality of the 3D image, the user may lower the degree of three dimensionality of the 3D image simply by touching and dragging on the stereoscopic information gauge 653.

In short, the stereoscopic information gauge 653 may be used not only to provide stereoscopic information of a 3D image but also to adjust the degree of three dimensionality of the 3D image.

Figure 15:
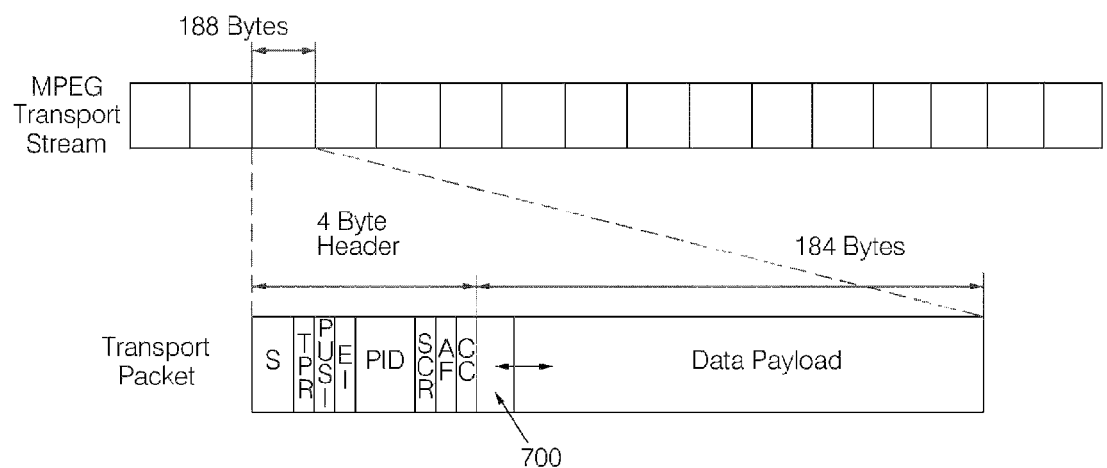
FIG. 15 is a diagram illustrating an example of a broadcast signal having stereoscopic information.

FIG. 15 is a diagram illustrating an example of how to insert stereoscopic information into a broadcast signal and transmit the broadcast signal. Referring to FIG. 15, an MPEG transport stream (TS) packet includes a header and a payload. The header has a fixed length of 4 bytes and includes a sync byte, a packet identifier (ID), a scramble control data and an adaptation field.

MPEG-4 video frames are classified into an intra-coded frame (I frame), a predictive-coded frame (P frame), and a bidirectional-coded frame (B frame) according to how they are coded. An I frame is an independent frame and can thus be coded as a single image, independently of other previous or subsequent frames. A P frame is coded with reference to its previous I or P frame. That is, a P frame can be coded as the difference with its previous frame. A B frame is coded with reference to its previous and subsequent P frames. In a group of pictures (GOP), which is a group of successive pictures within a coded video stream, an I frame, a plurality of P frames, and a plurality of B frames are arranged in a repetitive pattern, for example, IBBPBBPBBPBB, which is called a GOP pattern.

Stereoscopic information of a 3D content may be inserted into an MPEG TS packet, and the MPEG TS packet may be transmitted. For example, referring to FIG. 15, the stereoscopic information may be calculated in advance in units of I frames, and may then be recorded into a header expansion 700 or a data payload.

Unsatisfactory 3D images are often the results of excessive three dimensionality, errors in an image acquisition process, errors in an image display process and flickering. Examples of the errors in an image acquisition process include, but are not limited to, image misalignment, optical distortion and errors in camera settings. Examples of the errors in an image display process include, but are not limited to, misalignment of left- and right-eye images, which may cause severe headaches. Flickering is a phenomenon resulting from the display of dozens of images per second and may also cause headaches or nausea.

Given all this, not only including depth information of a 3D image but also including other information necessary for improving user satisfaction with the 3D image may all be provided as stereoscopic information of the 3D image.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to calculate stereoscopic information of a 3D image based on the difference in the position of an object within left- and right-eye images of the 3D image. Then, the stereoscopic information can be used for various purposes such as capturing, evaluating and playing 3D contents.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling operation of a mobile terminal, the method comprising:
   dividing at least a first and second image into a plurality of blocks, the first and second images capable of producing a three-dimensional (3D) image using binocular disparity;
   searching the at least first and second image for at least one pair of matching blocks based on a block matching algorithm using an evaluation function;
   calculating depth information related to each of the at least one pair of matching blocks based on a difference in position between each of the at least one pair of matching blocks;
   calculating stereoscopic information related to the 3D image based on the calculated depth information, the stereoscopic information calculated as an average or standard deviation of the calculated depth information of each of the at least one pair of matching blocks;
   displaying a playback screen of the 3D image in a color mode on a display module, the playback screen comprising a plurality of objects;
   displaying one or more objects selected from the playback screen three-dimensionally and non-selected objects two-dimensionally during the color mode;
   converting the playback screen from the color mode into a gray mode and displaying a stereoscopic information gauge on the playback screen when a user command for displaying the stereoscopic information related to the 3D image is detected, the stereoscopic information gauge divided into a plurality of sections filled with different brightness; and
   adjusting a degree of three-dimensionality of the playback screen in response to a user input detected on the stereoscopic information gauge during the gray mode.

2. The method of claim 1, wherein the stereoscopic information is further calculated in units of playback segments.

3. The method of claim 1, further comprising displaying the stereoscopic information as at least numeric data, a graph or an image.

4. The method of claim 1, further comprising displaying an indicator of the stereoscopic information on the display module.

5. A mobile terminal comprising:
   a display module configured to display a three-dimensional (3D) image based on at least a first and second image using binocular disparity; and
   a controller configured to:
   divide the at least first and second image into a plurality of blocks;
   search the at least first and second image for at least one pair of matching blocks based on a block matching algorithm using an evaluation function;
   calculate depth information related to each of the at least one pair of matching blocks based on a difference in position between each of the at least one pair of matching blocks;
   calculate stereoscopic information related to the 3D image based on the calculated depth information, the stereoscopic information calculated as an average or standard deviation of the calculated depth information of each of the at least one pair of matching blocks;
   display a playback screen of the 3D image in a color mode on the display module, the playback screen comprising a plurality of objects;
   display one or more objects selected from the playback screen three-dimensionally and non-selected objects two-dimensionally during the color mode;
   convert the playback screen from the color mode into a gray mode and display a stereoscopic information gauge on the playback screen when a user command for displaying the stereoscopic information related to the 3D image is detected, the stereoscopic information gauge divided into a plurality of sections filled with different brightness; and
   adjust a degree of three-dimensionality of the playback screen in response to a user input detected on the stereoscopic information gauge during the gray mode.

6. The mobile terminal of claim 5, wherein the controller is further configured to display the stereoscopic information on the display module as at least numeric data, a graph or an image.

7. The mobile terminal of claim 5, further comprising a memory configured to store the at least first and second image and the stereoscopic information.

8. A method of controlling operation of a mobile terminal, the method comprising:
   dividing at least a first and second image into a plurality of blocks, the first and second images capable of producing a three-dimensional (3D) image using binocular disparity;

searching the at least first and second image for at least one pair of matching blocks based on a block matching algorithm using an evaluation function;

calculating depth information related to each of the at least one pair of matching blocks based on a difference in position between each of the at least one pair of matching blocks;

calculating stereoscopic information related to the 3D image based on the calculated depth information, the stereoscopic information calculated as an average or standard deviation of the calculated depth information of each of the at least one pair of matching blocks and in units of Intra-coded frames (I-frames) of a moving image;

inserting the stereoscopic information into a transport packet of the I-frames; and transmitting the transport packet to another device;

displaying a playback screen of the 3D image in a color mode on a display module, the playback screen comprising a plurality of objects;

displaying one or more objects selected from the playback screen three-dimensionally and non-selected objects two-dimensionally during the color mode;

converting the playback screen from the color mode into a gray mode and displaying a stereoscopic information gauge on the playback screen when a user command for displaying the stereoscopic information related to the 3D image is detected, the stereoscopic information gauge divided into a plurality of sections filled with different brightness; and adjusting a degree of three-dimensionality of the playback screen in response to a user input detected on the stereoscopic information gauge during the gray mode.

9. The method of claim 8, further comprising displaying an indicator of the stereoscopic information on the display module.

10. The method of claim 8, wherein the stereoscopic information gauge is displayed in response to a particular user command or when the stereoscopic information satisfies a predefined set of conditions.

11. A mobile terminal comprising:
a display module configured to display information; and
a controller configured to:
divide each of the at least first and second image into a plurality of blocks, the first and second images capable of producing a three-dimensional (3D) image using binocular disparity;
search the at least first and second image for at least one pair of matching blocks based on a block matching algorithm using an evaluation function;
calculate depth information related to each of the at least one pair of matching blocks based on a difference in position between each of the at least one pair of matching blocks;
calculate stereoscopic information related to the 3D image based on the calculated depth information, the stereoscopic information calculated as an average or standard deviation of the calculated depth information of each of the at least one pair of matching blocks and in units of Intra-coded frames (I-frames) of a moving image;
insert the stereoscopic information into a transport packet of the I-frames and transmit the transport packet to another device;
display a playback screen of the 3D image in a color mode on the display module, the playback screen comprising a plurality of objects;
display one or more objects selected from the playback screen three-dimensionally and non-selected objects two-dimensionally during the color mode;
convert the playback screen from the color mode into a gray mode and display a stereoscopic information gauge on the playback screen when a user command for displaying the stereoscopic information related to the 3D image is detected, the stereoscopic information gauge divided into a plurality of sections filled with different brightness; and
adjust a degree of three-dimensionality of the playback screen in response to a user input detected on the stereoscopic information gauge during the gray mode.

12. The mobile terminal of claim 11, wherein the controller is further configured to display the stereoscopic information gauge on the display module in response to a particular user command.

13. The method of claim 8, wherein the stereoscopic information gauge is displayed on the display module when the degree of three-dimensionality of the displayed playback screen exceeds a reference level.

14. The mobile terminal of claim 11, wherein the controller is further configured to display the stereoscopic information gauge on the display module when the degree of three-dimensionality of the displayed playback screen exceeds a reference level.

15. The method of claim 1, wherein the evaluation function comprises at least a mean square error (MSE) function, a mean absolute error (MAE) function or a mean absolute difference (MAD) function.

16. The mobile terminal of claim 5, wherein the evaluation function comprises at least a mean square error (MSE) function, a mean absolute error (MAE) function or a mean absolute difference (MAD) function.

17. The method of claim 1, wherein:
the difference in position is a difference between an x coordinate value of a first of the at least on pair of matching blocks and an x coordinate value of a second of the at least one pair of matching blocks; and
the first and second of the at least one pair of matching blocks are a pair of matching blocks.

18. The mobile terminal of claim 5, wherein:
the difference in position is a difference between an x coordinate value of a first of the at least one pair of matching blocks and an x coordinate value of a second of the at least one pair of matching blocks; and
the first and second of the at least one pair of matching blocks are a pair of matching blocks.

* * * * *